Feb. 11, 1969  L. PARKIN ET AL  3,426,817
SHEET METAL NUT DEVICE
Filed March 21, 1967

INVENTORS:
LESLIE PARKIN &
SYDNEY ALAN ANDREWS,
BY Philip E. Parker
ATTORNEY

United States Patent Office 3,426,817
Patented Feb. 11, 1969

3,426,817
SHEET METAL NUT DEVICE
Leslie Parkin, Bobbers Hills, and Sydney Alan Andrews, Stapleford, England, assignors, by mesne assignments, to United-Carr Incorporated, Boston, Mass., a corporation of Delaware
Filed Mar. 21, 1967, Ser. No. 624,768
Claims priority, application Great Britain, Mar. 25, 1966, 13,352/66
U.S. Cl. 151—41.75    1 Claim
Int. Cl. F16b 39/00, 39/32, 13/04

ABSTRACT OF THE DISCLOSURE

A fastening device having a pair of arms with means of engaging the wall of an apertured support and a second pair of arms having their terminal ends bent inwardly toward each other having apertures formed therethrough. The terminal ends of the second pair of arms are in overlapping spaced relationship with each other.

---

A sheet metal nut device forming part of an adjustable buffer stop, the nut having resilient arm or arms biased into locking engagement with the threaded shank of a bolt adapted to be screwed into the nut means on the device.

This invention relates to a sheet metal nut device and is particularly but not exclusively adapted for receiving a screw threaded shank for an adjustable stop or buffer.

Adjustable stops or buffers are used for many purposes, for example, to limit the movement of a pedal or lever such as the accelerator pedal of a motor vehicle. It is necessary that the position of the stop should be readily adjustable, and heretofore it has been the practice for the stop to comprise a screw threaded shank which is adapted to be secured in its adjusted position by lock nuts. A disadvantage of this known arrangement is that it is necessary to loosen the lock nuts before the stop can be adjusted and retighten them after the adjustment has been effected. As the lock nuts are often located in a position which is difficult of access, a not inconsiderable amount of time and labour is entailed in effecting such adjustment.

According to the present invention, a sheet metal nut device comprises a cage-like member including a base provided with nut means, a first pair of opposed arms extending substantially normal from one face of the base and provided with means for attaching the cage-like member to an apertured support and at least one further arm extending substantially normal from the same face of the base and having an end portion extending inwardly of the cage-like member in parallel spaced relation to the base and formed with an aperture or recess, the said further arm being resiliently biased into a position such that an edge of the aperture or recess in the end portion makes locking engagement with a screw threaded shank when the same is disposed axially in the cage-like member and screw threaded engagement with the nut means in the base, the locking engagement being releaseable by the application of manually applied pressure against hte biasing action of the further arm.

If desired, two said further arms may be provided disposed in opposed parallel relation and each provided with an end portion arranged in overlapping relation with respect to one another and each formed with an aperture or recess, said further arms being biased in opposite directions so that edges of the apertures or recesses in the respective end portions will be adapted to make locking engagement with oppositely disposed sides of a shank assembled in the cage and engaging the nut means in the base.

To enable the invention to be fully understood, it will now be described, by way of example, with reference to the drawings accompanying the Provisional Specification in which.

Figure 1:
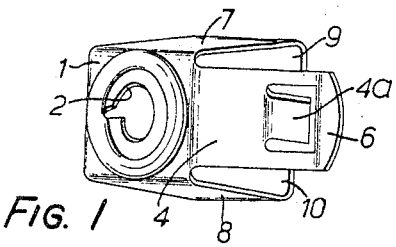
FIGURE 1 is a perspective view of a sheet metal nut device according to one embodiment of the invention.
Figure 2:
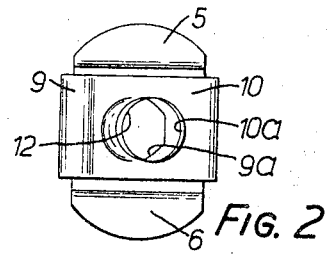
FIGURE 2 is an end view thereof.
Figure 3:
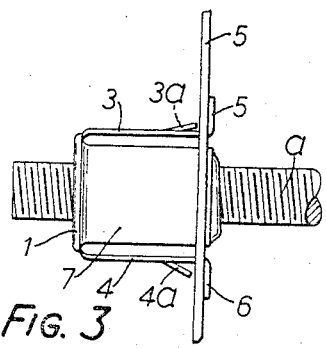
FIGURE 3 is a side view of the nut device assembled with a supporting panel and having a threaded shank assembled with the nut device.

As illustrated in FIGURES 1 to 5 of the drawings, the nut device is formed from a blank of sheet metal which has been operated on to form a cage-like member comprising a base 1 formed with an aperture 2 defined by a helically shaped edge forming nut means for receiving a screw threaded shank a.

A first pair of resilient arms 3, 4 extend integrally from the base 1 in opposed substantially parallel relation, the arms having outwardly extending resilient lugs 3a, 4a, and outwardly projecting feet 5, 6, at the free end. If desired, two lugs such as 3a, 4a may be provided on each arm 3, 4, one adjacent each side edge.

A second pair of resilient arms 7, 8, is provided also extending integrally from the base 1 in opposed substantially parallel relation, the arms having end portions 9, 10, extending inwardly in spaced substantially parallel relation to the base 1, each end portion being formed with apertures 9a, 10a, which have lips 11, 12, the edges of which are directed inwardly towards the respective arms 7, 8. The arms 7, 8, are normally resiliently biased away from one another into a position wherein the axes of the apertures 9a, 10a are out of alignment with the axis of the aperture 2 defining the nut means.

It will be noted that the arms 3, 4 extend from two opposed side edges of the base and the further arms 7, 8, extend from the other two opposed edges.

The nut device is assembled with an apertured support s by inserting the body of the cage-like member defined by the base and opposed pairs of arms axially through the aperture in the support to snap the lugs 3a, 4a therethrough wherein the nut device will be retained in assembly by the free ends of the lugs overlying one face of the support and the feet 5, 6 overlying the opposite face.

Figure 4:
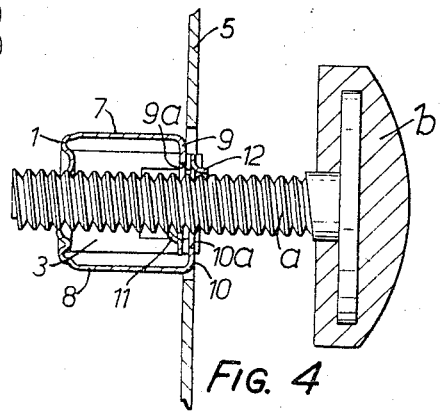
FIGURE 4 is a sectional side view of the nut device secured to a supporting panel with a screw threaded shank of a stop or buffer assembled therewith.
Figure 5:
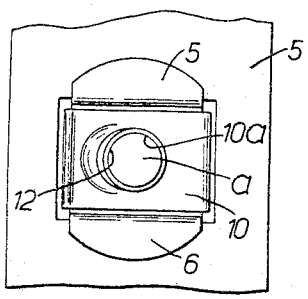
FIGURE 5 is a front view of the assembly illustrated in FIGURE 4, the head of the stop or buffer being omitted.

As more particularly illustrated in FIGURE 4, the nut device is particularly adapted for use with a stop or buffer including a screw threaded shank a having a padded head b adapted to form a stop for an operating member such as a pedal or lever.

To enable the shank a of the stop or buffer to be assembled with the nut device, manual pressure is applied to the arms 7, 8, to flex them inwardly against their inherent biasing action to align the apertures in the arms 7, and 8 with the aperture 2 of the nut means. The shank a is then readily inserted axially into the cage and screwed into the nut means in the base. When the pressure on the arms 7, 8, is released, the arms in tending to revert to their original biased position will cause the flared lips 11, 12, to be urged into locking engagement with the adjacent threaded portion of the shank a to lock the latter against rotation and thereby secure it in its adjusted position.

If the position of the head *b* of the stop or buffer relative to the support *s* needs to be adjusted, it is a simple matter to apply manual pressure to the arms 7, 8, to release the locking action to enable the shank to be screwed inwardly or outwardly, the shank being relocked in adjusted position by merely releasing the arms 7, 8.

The nut device according to the invention has an important advantage over known devices wherein the locking was effected by lock nuts which needed the use of spanners which were difficult to manipulate if the device was located in a confined space or one to which access was difficult. With the present invention the release and relocking of the shank is readily effected without the use of any tools and merely requires pressure to be applied to the arms 7, 8, which pressure can easily be effected by the fingers of one hand.

Figure 6:
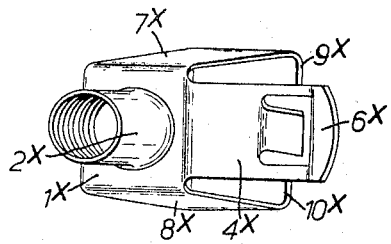
FIGURE 6 is a perspective view of a sheet metal nut device according to a modified form of the invention.

The modified embodiment illustrated in FIGURE 6 is similar in most respects to that illustrated in FIGURES 1 to 5, and like parts have been given like reference numerals but with the addition of suffix *x*. The modified embodiment, however, differs in the design of the nut means, and, as shown, comprises a tubular collar 2*x* projecting outwardly and centrally of the base 1*x* and formed with internal threads for receiving a screw threaded shank such as *a*.

While in both embodiments illustrated in the drawings two further arms 7, 8 are shown, if a less strong locking action is called for, only one arm could be provided.

We claim:

1. A sheet metal nut device for assembly with an apertured support comprising a base provided with nut means for receiving a screw threaded shank, a first pair of opposed arms extending substantially normal from one face of the base, means on said arms for attaching the nut device to an apertured support and at least two further arms extending substantially normal from the same face of the base as said first mentioned arms and being in opposed relationship to each other, an end portion formed on each of said further arms extending inwardly of the said base in parallel spaced relation thereto, each of said end portions having an aperture extending therethrough and the end portion of one of said further arms being disposed in overlapping substantially parallel relation to the end portion of the other of said further arms so as to substantially align the apertures therein, each of said further arms being resilient, the walls defining the apertures therein being biased into locking engagement with a screw threaded shank when the same is screwed into said nut means in the base, the locking engagement being releasable by the application of manually applied pressure against the biasing action of said further arms.

References Cited

UNITED STATES PATENTS

| | | | |
|---|---|---|---|
| 1,304,150 | 5/1919 | Blaylock | 85—36 |
| 2,283,122 | 5/1942 | Murphy. | |
| 2,399,957 | 5/1946 | Tinnerman | 151—41.75 |
| 2,404,236 | 7/1946 | Kost | 85—80 |
| 2,627,294 | 2/1953 | Bedford | 151—15 |
| 3,261,357 | 7/1966 | Roberts et al. | 85—36 |

FOREIGN PATENTS

| | | |
|---|---|---|
| 137,806 | 6/1950 | Australia. |
| 650,330 | 2/1951 | Great Britain. |

MARION PARSONS, Jr., *Primary Examiner.*

U.S. Cl. X.R.

85—80; 151—11